July 14, 1964     H. W. McROBBIE     3,140,931
SEPARATION OF AN OXYGEN-NITROGEN MIXTURE
Filed Dec. 1, 1960     2 Sheets-Sheet 1

INVENTOR.
*Henry W. McRobbie*
BY
*Thomas J. O'Brien*
ATTORNEY

July 14, 1964  H. W. McROBBIE  3,140,931
SEPARATION OF AN OXYGEN-NITROGEN MIXTURE
Filed Dec. 1, 1960  2 Sheets-Sheet 2

INVENTOR.
Henry W. McRobbie
BY
Thomas D. O'Brien
ATTORNEY

United States Patent Office 3,140,931
Patented July 14, 1964

3,140,931
SEPARATION OF AN OXYGEN-NITROGEN
MIXTURE
Henry W. McRobbie, Snyder, N.Y., assignor to Union
Carbide Corporation, a corporation of New York
Filed Dec. 1, 1960, Ser. No. 73,029
9 Claims. (Cl. 55—25)

This invention relates to the separation of an oxygen-nitrogen mixture, and more specifically relates to improved process and apparatus for separating such mixture by contact with an adsorbent material.

The recovery of oxygen from an oxygen-nitrogen mixture such as air is of proven commercial importance, oxygen finding a wide variety of uses such as for the manufacture of steel, welding and cutting of metals and for therapeutic employment. This separation is commonly effected by low temperature rectification of air cooled to temperatures near the boiling points of the components, namely —183° C. and —196° C. for oxygen and nitrogen, respectively, at atmospheric pressure. Also, the gas mixture is often compressed to a relatively high pressure such as 2,000 p.s.i. so that refrigeration may be recovered by work expansion of the gas to a lower pressure level and power costs minimized. It will be appreciated that the cooling of air to the —183° C. level requires special refrigeration equipment which is complicated and expensive to operate as well as costly to build. Commonly used refrigeration systems such as those employing the halogenated hydrocarbons and carbon dioxide are not cold enough to reach this temperature level, and it is usually necessary to employ at least part of the separated oxygen and nitrogen components for cooling purposes in low temperature air rectification systems. Another exceedingly expensive and complicated aspect of the prior art air separation systems is the rectification column which usually comprises a large number of liquid-gas contact means such as perforated trays.

Despite these limitations, air separation by low temperature rectification has been found satisfactory where large quantities of oxygen are required such as in the manufacture of steel. However, for relatively small consumption patterns the initial investment or cost of the air separation plant becomes more important relative to power costs than for larger units. For this reason, it is desirable to employ simpler and less expensive systems for small scale uses of oxygen, even though operating costs may be slightly higher. Furthermore, it is always desirable to produce large quantities of oxygen more economically.

Certain crystalline zeolitic molecular sieve materials in certain temperature ranges have a marked selective affinity for nitrogen in preference to oxygen, and various pressure swing cycles have been proposed which utilize this characteristic for the production of oxygen gas. However, in a pressure swing cycle involving above and below atmospheric pressures, the conservation of refrigeration is essential. Since the desorption and repressurization streams in such cycles flow at high rates and only during very short periods of the total cycle, effective countercurrent heat exchange between the cold, subatmospheric pressure exhaust gas and the warm feed gas cannot be achieved unless the maximum flow rates and periods of flow are matched and an uneconomically large heat transfer surface is provided.

An object of the present invention is to provide an improved process for separating an oxygen-nitrogen mixture such as air.

Another object is to provide an improved process for oxygen-nitrogen separation which does not require the very cold temperatures normally associated with separation by low temperature rectification.

Still another object of this invention is to provide an improved oxygen-nitrogen separation system which does not require a rectification column or the high pressures normally associated with certain systems.

A further object is to provide a highly efficient oxygen-nitrogen separation process employing crystalline zeolitic molecular sieves in a pressure swing cycle, in which the sensible refrigeration of the desorbate gas is substantially completely recovered.

A still further object is to provide an oxygen-nitrogen separation process using crystalline zeolitic molecular sieve adsorbents in which the desorbate gas refrigeration may be recovered without matching the gas flow rates nor employing large heat transfer surfaces.

Other objects and advantages of the present invention will be apparent from the subsequent disclosure and appended claims.

Figure 1:
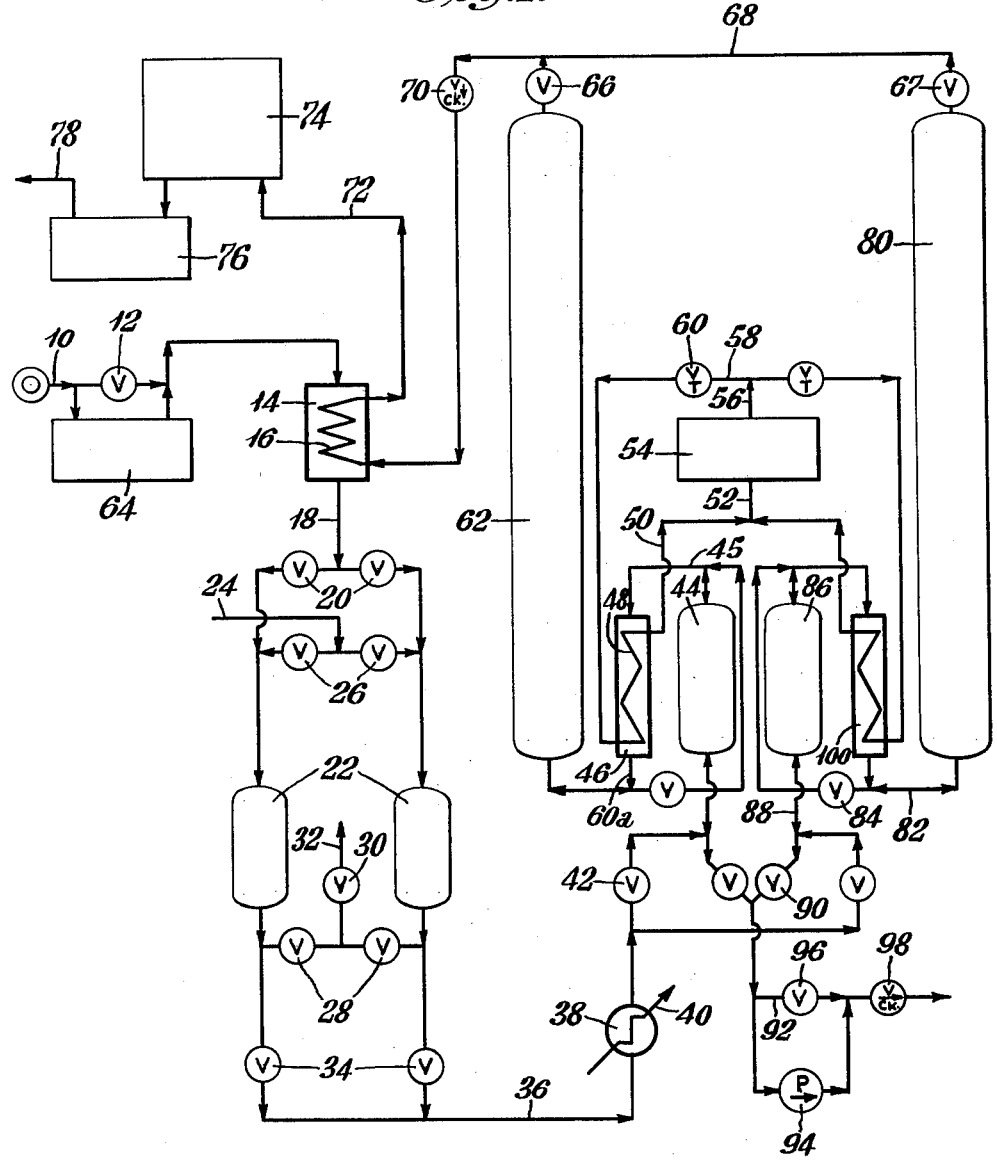
FIG. 1 is a schematic flowsheet of a process for continuously separating an oxygen-nitrogen gas mixture according to the present invention.
Figure 3:
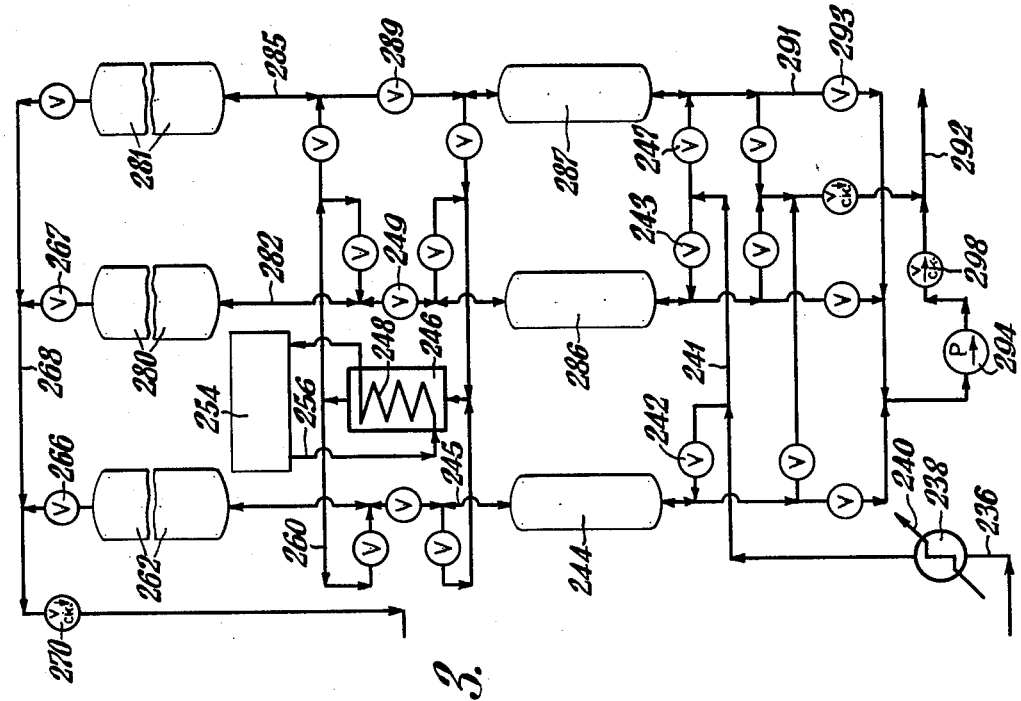
FIG. 3 is a schematic flowsheet of another process similar to FIG. 1 but differing in that three crystalline zeolitic molecular sieve beds are employed.
Figure 2:
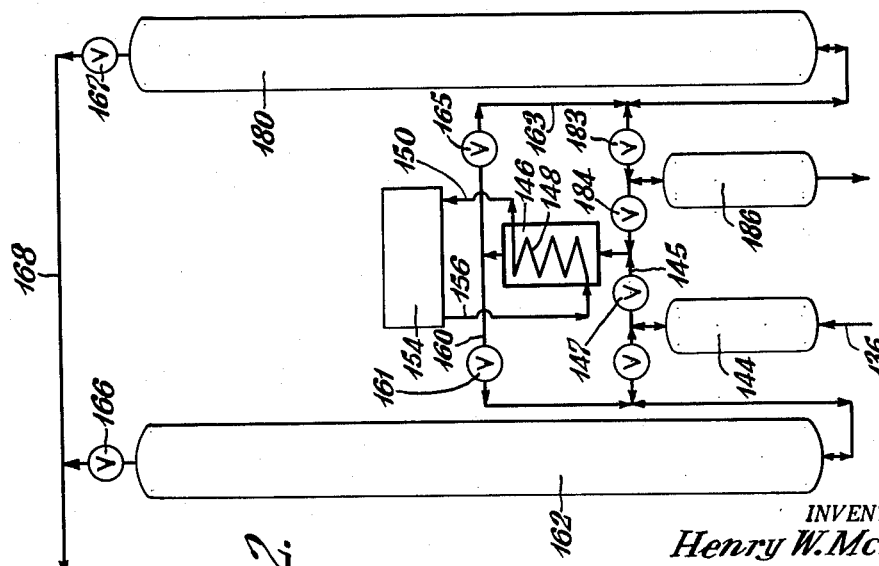
FIG. 2 is a schematic flowsheet of a process similar to FIG. 1 but differing in certain particulars in that only one externally cooled heat exchanger is employed.

Similar items in FIGS. 2 and 3 have been identified by adding one hundred and multiples thereof to the numeral identifying the corresponding item in FIG. 1.

It has been unexpectedly discovered than an oxygen-nitrogen gas mixture may be separated in a highly efficient manner with crystalline zeolitic molecular sieves by employing recuperative beds for refrigeration recovery from the nitrogen desorbate and transfer to the warm inlet gas mixture. More specifically, the present invention contemplates a process for separating an oxygen-nitrogen containing mixture in which the feed gas is provided at ambient temperature and at least atmospheric pressure. The feed gas is contacted with a previously cooled bed of recuperative material such as pebbles thereby cooling the feed to a first subambient temperature. The cooled gas is then further cooled to a second lower subambient temperature, and contacted with a bed of crystalline zeolitic molecular sieve material having apparent pore sizes of at least 4.6 Angstroms. In this manner, at least most of the nitrogen constituent is adsorbed from the gas mixture at a temperature where zeolite adsorption efficiency is high. An oxygen product gas is then discharged from the molecular sieve bed.

As a regeneration stroke the feed gas-molecular sieve bed contact is terminated, and the further cooled nitrogen desorbate gas is drawn from such bed in a direction countercurrent to the previous feed gas flow, and contacted with the recuperative bed thereby recooling the bed for subsequent contacting with the feed gas to be cooled. The drawing is of sufficient magnitude to reduce the pressure of the molecular sieve bed to a second lower pressure which may be subatmospheric.

This embodiment of the invention is particularly suitable where the storage of product gas is impractical and/or where a continuous supply of oxygen product gas is not required. The invention also contemplates a continuous system for separating oxygen and nitrogen wherein the feed gas is contacted with a previously cooled first bed of recuperative material, further cooled, and then contacted with a first bed of crystalline zeolitic molecular sieve material. As a regeneration stroke, further cooled nitrogen desorbate is drawn from a second molecular sieve bed and contacted with a second bed of recuperative material for recooling thereof. The flows are periodically switched so as to place the second molecular sieve bed on adsorption stroke and the first molecular sieve bed on regeneration stroke.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced element metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention include erionite, calcium-rich chabazite and faujasite. The natural materials are adequately described in the chemical art. The preferred synthetic crystalline zeolitic molecular sieves include types X, Y, L, T, and the divalent cation exchanged zeolites A, D and R. Crystalline zeolites having apparent pores sizes of at least 4.6 Angstroms are satisfactory because they permit rapid adsorption and desorption of the nitrogen molecules particularly in the lower temperature region, leading to faster operating cycles than attainable with small pore size zeolites.

Zeolite A is a crystalline zeolitic molecular sieve which may be represented by the formula:

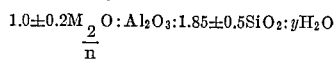

where M represents a metal, $n$ is the valence of M, and $y$ may have any value up to about 6. The as-synthesized zeolite A contains primarily sodium ions and is designated sodium zeolite A. All of the monovalent cation forms of zeolite A have an apparent pore size of about 4 Angstroms, excepting the potassium form which has a pore size of about 3 Angstroms and consequently none of the monovalent forms are suitable for use in the present invention. When at least about 40 percent of the monovalent cations sites are satisfied with di- or trivalent metal cations, zeolite A has an apparent pore size of about 5 Angstroms. Zeolite A is described in more detail in U.S. Patent No. 2,882,243, issued April 14, 1959, to R. M. Milton.

Zeolite D is described and claimed in U.S. patent application Serial No. 630,383, filed August 26, 1957.

Zeolite L has an apparent pore size of about 10 Angstroms, and is described and claimed in U.S. patent application Serial No. 711,565, filed January 28, 1958, now abandoned.

Zeolite R is described and claimed in U.S. patent application Serial No. 680,381, filed August 26, 1957, now Patent No. 3,030,181, issued April 17, 1962.

Zeolite T has an apparent pore size of about 5 Angstroms, and is described and claimed in U.S. patent application Serial No. 733,819, filed May 8, 1958, now U.S.P. 2,950,952, issued August 30, 1960.

Zeolite X has an apparent pore size of about 10 Angstroms, and is described and claimed in U.S. Patent No. 2,882,244 having issued April 14, 1958, to R. M. Milton.

Zeolite Y has an apparent pore size of about 10 Angstroms, and is described and claimed in U.S. patent applications Serial Nos. 728,057 and 862,062, filed respectively on April 14, 1958, and December 28, 1959, now both abandoned.

Referring now more specifically to FIG. 1, an oxygen-nitrogen containing feed gas such as air is supplied to conduit 10 at ambient temperature and a first higher pressure, directed through compressor bypass valve 12, and hence to feed gas cooler 14 for countercurrent heat exchange to a range of about 10° to 40° C. with the oxygen product gas in passageway 16 when such gas is being recovered. The feed gas emerges from cooler 14 into conduit 18 and is directed through either of inlet valves 20 to driers 22 for removal of feed gas moisture. The effectiveness of a crystalline zeolitic molecular sieve adsorbent for oxygen-nitrogen separation will not reach its highest potential if the moisture content of the feed gas is not maintained at a low value. With feed streams containing moisture in concentrations of several parts per million or less, the nitrogen adsorbers of the present process can be operated continuously at temperatures below 0° C. for periods of a year or more. Raising the temperature of the purge-regeneration of the drying adsorbent, increasing the quantity of purge gas and increasing the ratio of the pressure of the adsorption operation to the regeneration operation all tend to increase the effectiveness of regeneration and thereby prolong the period of operation before dehydration of the adsorbent is required. The only known regenerable solid drying agent capable of producing the requisite moisture contents approaching one p.p.m. in feed air at normal ambient temperatures are molecular sieves. Molecular sieve 4A, which contains sodium zeolite A and has an apparent pore size of about 4 Angstroms is preferred, as it possesses maximum stability to water adsorption-desorption cyclic operation. This material is manufactured by the Linde Company. An advantage in employing molecular sieves of no more than 4 Angstrom pore size is that the total adsorption of non-water molecules such as those of oil from an air compressor is minimized thereby retaining substantially all of the sieve's capacity for water removal and maximizing the periods between regeneration.

Regeneration of the molecular sieve driers may be accomplished by introducing a purge gas such as hot air through conduit 24 and either of inlet valves 26 for flow through the off-stream drier 22. The resulting moisture-containing purge gas is discharged from drier 22 through either of valves 28 and preferably vented from the system through valve 30 in conduit 32.

The dried feed gas is discharged from either of molecular sieve driers 22 and valves 34 to conduit 36 for flow through heat exchanger 38 where the heat of adsorption is removed by a suitable coolant, such as water, flowing through passageway 40. It should be understood that the employment of heat exchanger 38 is not essential to the practice of this invention. If in a given plant, the temperature of the dried feed gas is higher than the available cooling water temperature at that location, the cooler would preferably be employed to reduce the heat load on the recuperator and the following refrigeration system. The dried feed gas is directed through control valve 42 to first recuperator 44 which is filled with a suitable refrigeration storage material such as pebbles. Other satisfactory materials include aluminum, copper and various refractory materials such as $Al_2O_3$. Recuperator 44 has previously been cooled by the passage of cold nitrogen desorbate gas therethrough, and may for example cool the feed gas from about 20° C. to about −30° C.

For maximum oxygen-nitrogen separation efficiency commensurate with the cost and complexity of the necessary refrigeration system to provide progressively lower temperatures, it is preferred but not essential to conduct the nitrogen adsorption step in a temperature range of −30° C. to −50° C. To this end, an external refrigeration system may be provided including heat exchanger 46 and passageway 48. The partially cooled feed gas emerging from first recuperator 44 is directed through conduit 45 to first external heat exchanger 46 for further cooling to a range of about −10° C. to −60° C. The coolant to effect such further cooling is circulated upwardly through passageway 48, and may for example be vaporized during the circulation. Suitable refrigerants include ammonia, monobromotrifluoromethane, monochlorodifluoromethane and dichlorodifluoromethane, the latter being preferred. The warmed refrigerant emerging from the upper end of passageway 48 is directed through conduit 50 and communicating conduit 52 to refrigerator 54 where it is recompressed and recondensed for recirculation through conduit 56 and connecting branch conduit 58 to first external heat exchanger 46. The recirculating refrigerant is throttled through valve 60 prior to entering exchanger 46.

The further cooled feed gas emerging from first external heat exchanger 46 at a temperature preferably between −40° C. and −50° C. is directed through conduit 60a to the base of first adsorber 62 containing a suitable crystalline zeolitic molecular sieve material having an apparent pore size of at least 4.6 Angstroms. Calcium zeolite A with an apparent pore size of about 5 Angstrom units is preferred. First adsorber 62 will be at a second lower pressure at the on set of the adsorption stroke since the preceding regeneration stroke included drawing of the nitrogen desorbate from such bed to such pressure. During the adsorption stroke, nitrogen is preferentially adsorbed from the feed gas mixture, and as the pressure in the first adsorber 62 approaches that of the atmosphere, bypass valve 12 is closed and compressor 64 is started. When the first adsorber pressure reaches a predetermined desired value preferably in the range of 20 to 50 p.s.i.a., e.g., 26 p.s.i.a., discharge valve 66 in conduit 68 is opened and oxygen product gas at for example about −30° C. flows therethrough and also through check valve 70 to feed gas cooler 14 where sensible refrigeration is recovered from such product gas in passageway 16. The warmed product gas is directed through conduit 72 to gas holder 74 and thence to oxygen compressor 76 for pressurization to any desired level such as 2,500 p.s.i.a. The compressed oxygen product of for example 93% purity is dicharged from compressor 76 into conduit 78 for consumption.

During the period when first adsorber 62 is on the adsorption stroke, second adsorber 80 is being regenerated so as to be ready for the adsorption step when the first adsorber becomes loaded with nitrogen molecules. To this end, second adsorber 80 is initially blown down through conduit 82, bypass valve 84 therein and second recuperator 86 to substantially atmospheric pressure. In this manner the sensible refrigerative content of the nitrogen desorbate is recovered by the recuperative material for subsequent transfer to the incoming oxygen-nitrogen feed gas stream in the previously described manner. The warmed nitrogen desorbate gas emerging from the lower end of second recuperator 86 flows through conduit 88 and flow control valve 90 therein to communicating conduit 92 which bypasses vacuum pump 94. Conduit 92 contains control valve 96 and check valve 98, and the nitrogen desorbate emerges therefrom for venting to the atmosphere.

Vacuum pump 94 is started when the pressure in second adsorber 80 is substantially atmospheric and the latter is then evacuated to the desired second lower pressure preferably in the range of 0.1 to 4 p.s.i.a., e.g., 1.0 p.s.i.a. As there is no advantage in passing the nitrogen desorbate through the second external heat exchanger 100, the latter is preferably bypassed during the regeneration stroke. The time required for blowdown and repressurization is shortened by operation in this manner.

The effect of pressure difference between adsorption and desorption is usually to increase the differential working loading of the adsorbable component in the zeolitic molecular sieve. In the case of nitrogen-oxygen separation, pressure can also influence the separation or selectivity factor. Still another consideration is the economic balance of the cost of compression of the total feed stream with the cost of drawing the desorbate, which is less in volume by the amount of product which has been passed through the adsorption stroke.

When first adsorber 62 is loaded with nitrogen, the flows may be switched so as to place the former on regeneration stroke and the second adsorber 80 on adsorption stroke. This can be accomplished because the respective adsorbers 62 and 80, external heat exchangers 46 and 100, and recuperators 44 and 86 are piped in parallel flow relation. Thus, feed gas is directed consecutively through second recuperator 86 and second external heat exchanger 100 to second adsorber 80. In this manner, the refrigeration from the nitrogen desorbate which has previously been transferred to second recuperator 86 is recovered by the inflowing feed gas.

The present invention provides for efficient recovery of sensible refrigeration from the nitrogen desorbate and consequently reduces the cost and quantity of externally supplied refrigeration. The effectiveness of the recuperators in this process is illustrated by the following example in which ten tons per day of 93% oxygen are to be produced from a dried air stream which enters the recuperators at 20° C. and leaves at an average temperature of −31° C., the nitrogen desorbate being heated therein from an average temperature of −40° C. to 19° C., within a degree of the inlet temperature of the air feed stream. In this particular example, cooling of the air feed stream to −41° C. before entering the adsorber was required, so that the recuperator carried about 83.6% of the total cooling load. Also the duration of the adsorber blowdown and repressurization periods can amount to as little as 5 to 10% of the total cycle time, and these periods need not occur simultaneously as would be necessary in some prior art systems.

FIG. 2 illustrates another embodiment of the invention in which oxygen product gas is continuously produced and only one instead of two external heat exchangers is employed to further cool the oxygen-nitrogen mixture. Although additional valving is required, its cost is more than offset by the elimination of one external heat exchanger. Referring now more specifically to FIG. 2, only the recuperator-external heat exchanger and adsorber section of the flowsheet is shown. The remaining portion of the cycle is identical to that previously described and illustrated in FIG. 1. The feed gas is introduced through conduit 136 to first recuperator 144 where it is partially cooled by refrigeration previously stored therein. The partially cooled gas is discharged through conduit 145 and control valve 147 to external heat exchanger 146 where it is further cooled by the refrigerant in passageway 148. The further cooled feed gas emerging from exchanger 146 into conduit 160 flows through control valve 161 and into first adsorber 162 for removal of the nitrogen component in the previously described manner.

During the depressurization or blowdown portion of the regeneration stroke of second adsorber 180, the cold nitrogen desorbate gas is discharged through conduit 182 and control valve 183 to second recuperator 186 for recooling of the latter. The warmed desorbate is discharged through conduit 188. It will be noted that gas flow through conduit 163 to external heat exchanger 146 is blocked by closing control valve 165.

As previously discussed, the flow of product oxygen may be made continuous if blowdown, evacuation and repressurization of one adsorber are all accomplished during that portion of the total cycle in which product is being removed from the other adsorber. When operated in this manner, however, a larger vacuum pump is required to remove a given quantity of gas than would be the case if the pump were to operate continuously. The use of three adsorbers and three recuperators, as illustrated in FIG. 3, permits continuous product removal and continuous vacuum pumping from separate adsorbers while a third adsorber is either being blown down or repressurized.

Referring now more specifically to FIG. 3, the feed gas flows through conduit 236 and control valve 242 to first recuperator 244 for partial cooling therein. The partially cooled gas emerges through conduit 245 and is further cooled in external heat exchanger 246. The resulting cold oxygen-nitrogen mixture is directed through conduit 260 to first adsorber for removal of the nitrogen component. The oxygen product is discharged through conduit 268 having check valve 270 therein. Meanwhile, second adsorber 280 is being repressurized with feed gas by diversion of a portion thereof from conduit 236 through branch conduit 241 and inlet control valve 243 to second recuperator 286. The partially cooled feed gas emerging therefrom is directed through control valve 249 in conduit 282 to second adsorber 280 for repressurization of the latter. When this step is completed, inlet valve 243 may be closed to isolate the repressurized second adsorber 280 until the latter is to be placed on adsorption stroke. Alternatively, the repressurization step may be timed so as to be completed just before first adsorber is placed on regeneration.

During the period first adsorber 262 is on-stream and second adsorber 280 is being repressurized, third adsorber 281 is evacuated and third recuperator 287 is recharged with refrigeration. This is accomplished by drawing cold nitrogen desorbate gas from third adsorber 281 by means of vacuum pump 294. The cold withdrawn gas flows through conduit 285 and control valve 289 therein to third recuperator 287 and recools the latter. The resulting warmed gas emerges into conduit 291 and passes through control valve 293 to pump 294. The warm nitrogen gas is then discharged from the system through conduit 292 having check valve 298 therein.

It will be appreciated that the three adsorbers 262, 280 and 281 and three recuperators 244, 286 and 287 are piped in parallel flow relation, and all communicate with external heat exchanger 246. Furthermore, appropriate valving is provided so that the various flows may be switched in a manner which will be understood by those skilled in the art. For example, when first adsorber 262 is taken off the adsorption stroke and placed on the regeneration stroke, second adsorber 280 is placed on the adsorption stroke and the previously evacuated third absorber 281 is repressurized. After this sequence, third adsorber 281 will be placed on the feed gas stroke, second adsorber 280 on evacuation and first adsorber 262 on repressurization. The next succeeding flow changes will establish the same conditions as originally described.

Although preferred embodiments of the invention have been described in detail, it is contemplated that modifications of the process and apparatus may be made and that some features may be employed without others, all within the spirit and scope of the invention.

What is claimed is:

1. A process for separating an oxygen-nitrogen mixture comprising the steps of providing an oxygen-nitrogen containing feed gas mixture at ambient temperature and a first higher pressure; contacting the feed gas with a previously cooled bed of recuperative material thereby cooling such feed gas to a first subambient temperature; further cooling the feed gas to a second lower subambient temperature; contacting the further cooled feed gas with a bed of crystalline zeolitic molecular sieve material having apparent pore sizes of at least 4.6 Angstroms, thereby selectively absorbing at least most of said nitrogen from the gas mixture; discharging an oxygen product gas from the molecular sieve bed; as a regeneration stroke, terminating the feed gas-molecular sieve bed contact, drawing the cooled nitrogen desorbate gas from such bed in a direction counter-current to the previous feed gas flow and contacting such desorbate with the recuperative bed thereby recooling such bed for further contacting with the ambient temperature feed gas, such drawing being of sufficient duration and magnitude to reduce the pressure of said molecular sieve bed to a second lower pressure.

2. A process for separating an oxygen-nitrogen mixture comprising the steps of providing an oxygen-nitrogen containing feed gas mixture at ambient temperature and a first higher pressure; contacting the feed gas with a previously cooled first bed of recuperative material thereby cooling such feed gas to a first subambient temperature; further cooling the feed gas to a second lower subambient temperature; as an adsorption stroke, contacting the further cooled feed gas with a first bed of crystalline zeolitic molecular sieve material having apparent pore sizes of at least 4 Angstroms, thereby selectively adsorbing at least most of said nitrogen from the gas mixture, and discharging an oxygen product gas from the first molecular sieve bed; as a regeneration stroke, drawing further cooled nitrogen gas from a second bed of said crystalline zeolitic molecular sieve material, said nitrogen having previously been adsorbed therein during an adsorption stroke, in a direction countercurrent to the previous feed gas flow, and contacting such nitrogen desorbate with a second bed of recuperative material thereby recooling such bed for subsequent contacting and cooling of said feed gas, the drawing being of sufficient duration and magnitude to reduce the pressure of said second molecular sieve bed to a second lower pressure; and periodically switching the flows so as to place said second molecular sieve bed on said adsorption stroke and said first molecular sieve bed on said regeneration stroke.

3. A process according to claim 1 in which an external refrigerant is provided for said further cooling of the feed gas to said second lower subatmospheric temperature.

4. A process according to claim 2 in which air is said oxygen-nitrogen containing feed gas mixture and an external refrigerant is provided for said further cooling of the feed gas to said second lower subatmospheric temperature.

5. A process according to claim 1 in which the feed gas contains moisture and such feed gas is contacted with a bed of crystalline zeolitic molecular sieve material having apparent pore sizes of no more than about 4 Angstroms for removal of said moisture, such contacting being effected prior to said cooling by said first bed to recuperative material.

6. Apparatus for separating oxygen-nitrogen gas mixtures comprising means for providing such feed gas mixture at ambient temperature and a first higher pressure; a first bed of previously cooled recuperative material for cooling such feed gas to a first sub-ambient temperature; means for further cooling the feed gas to a second lower sub-ambient temperature; a bed of crystalline zeolitic molecular sieve material having apparent pore sizes of at least 4.6 Angstroms for selectively adsorbing said nitrogen from the further cooled feed gas; and vacuum pump means for drawing further cooled nitrogen desorbate gas from the molecular sieve bed in a direction countercurrent to the previous feed gas flow and passing such cold gas to the bed of recuperative material thereby cooling such bed for subsequent contact with said feed gas.

7. Apparatus according to claim 6 in which an externally supplied refrigerant constitutes said means for further cooling said feed gas.

8. Apparatus for separating oxygen-nitrogen gas mixtures comprising means for providing such feed gas mixture at ambient temperature and at a first higher pressure; a first bed of previously cooled recuperative material for cooling such feed gas to a first sub-ambient temperature; means for further cooling the feed gas to a second lower sub-ambient temperature; a first bed of crystalline zeolitic molecular sieve material having apparent pore sizes of at least 4.6 Angstroms for selectively absorbing said nitrogen from the further cooled feed gas; a second bed of said zeolitic molecular sieve material containing a nitrogen adsorbate having previously been removed from the further cooled feed gas; a second bed of said recuperative material, vacuum pump means for drawing the further cooled nitrogen from the second molecular sieve bed in a direction countercurrent to the previous feed gas flow and passing such cold gas through the second recuperative material bed thereby recooling such bed for subsequent cooling of said feed gas; and means for periodically switching the flows so as to pass the feed gas consecutively through the cooled second recuperative material bed and said second molecular sieve bed for selective adsorption of said nitrogen, and draw the further cooled nitrogen from the first molecular sieve bed and through the first recuperative material bed for recooling thereof.

9. Apparatus according to claim 6 in which a bed of crystalline zeolitic molecular sieve material having apparent pore sizes of no more than about 4 Angstroms is provided for removing moisture from the feed gas prior to said cooling in said first bed of previously cooled recuperative material.

References Cited in the file of this patent
UNITED STATES PATENTS

| | | |
|---|---|---|
| 2,872,397 | Kiffer | Feb. 3, 1959 |
| 2,882,243 | Milton | Apr. 14, 1959 |
| 2,882,998 | Grenier | Apr. 21, 1959 |
| 2,944,627 | Skarstrom | July 12, 1960 |